Patented Apr. 19, 1927.

1,625,608

UNITED STATES PATENT OFFICE.

ROY T. HOLMES, OF ATHENS, GEORGIA.

COMPOSITION FOR KILLING CERTAIN WEEDS.

No Drawing. Application filed October 6, 1924. Serial No. 742,071.

The invention relates to a composition for exterminating and killing noxious weeds which flourish prolifically in various sections of the country to the decided detriment of meadow grasses and other valuable and useful vegetation, not only in hindering the growth of such desirable vegetation, but rendering the latter unavailable for grazing of milk-producing animals which eat the weeds with grass and thereby impair their milk to such an extent as to render the same unfit for human consumption. Among the weeds which are particularly objectionable and offensive, and which are promptly killed by the method and preparation forming the basis of this application, are *Helenium tenuifolium*, *Ambrosia artemisiæfolia* and *Anthemis cotula*. All of these weeds are annuals prolific in seed production, vigorous in growth, and unless effectively checked will either kill off the desirable grazing grass and herbage, or render the same unsuitable for stock feed. The first mentioned weed in particular, when consumed along with the meadow grass, by milch cows, renders the milk so bitter as to prohibit its use for human consumption, so that land infested with the weed must be abandoned for grazing purposes. The other weeds while not so obnoxious and objectionable, from the standpoint of milk contamination, are quite as harmful as *Helenium tenuifolium* in choking the growth of the useful grasses and plants, thereby depleting the pasturage.

I have found that ammonium sulphate applied to the weeds aforesaid, preferably in the form of an aqueous solution applied as a spray, will kill all of said weeds in from six to twenty-four hours, without in any way injuriously affecting the grasses, but on the contrary enhancing the growth and development of the grasses, apparently by virtue of the nitrogen content of the ammonium sulphate, which is taken up by the grasses.

The exterminator is preferably prepared for use by dissolving commercial sulphate of ammonium, $(NH_4)_2SO_4$, in water to the point of saturation and then diluting the solution according to the results desired and depending largely on the extent of development of the weeds.

I have found, for example, that a solution containing from three quarters of a pound to one pound of ammonium sulphate per gallon of water, when sprayed on a pasture infested with *Helenium tenuifolium*, in quantity sufficient to wet the leaves, will kill the weed within twenty-four hours, and actually stimulate the growth of the useful meadow grasses and furthermore, will produce no harmful effect on the cattle, or upon the milk produced by the latter.

Preferably the exterminator is applied in the spring, before the weeds attain maturity, thereby avoiding the danger of reseeding the infected area, so that usually a single application will eradicate the weeds from the entire area treated and commensurately promote the healthy growth and development of the desirable pasturage and vegetation by reason of the fact that the latter are not robbed of their natural nutriment, obtained from the soil and the air, by the weeds, but find an additional stimulant to rapid development in the nitrogen obtained from the weed killer per se.

What I claim is:

1. An exterminator for noxious weeds comprising sulphate of ammonium.

2. An exterminator for noxious weeds comprising an aqueous solution of sulphate of ammonium.

In testimony whereof I affix my signature.

ROY T. HOLMES.